(12) United States Patent
Li

(10) Patent No.: US 10,371,970 B2
(45) Date of Patent: Aug. 6, 2019

(54) DISPLAY SCREEN HAVING MIRROR FUNCTION, CONTROL METHOD, DEVICE AND TERMINAL

(71) Applicant: ZTE CORPORATION, Guangdong (CN)

(72) Inventor: Jun Li, Guangdong (CN)

(73) Assignee: ZTE CORPORATION, Guangdong (CN)

(*) Notice: Subject to any disclaimer, the term of this patent is extended or adjusted under 35 U.S.C. 154(b) by 6 days.

(21) Appl. No.: 15/513,391

(22) PCT Filed: Jul. 20, 2015

(86) PCT No.: PCT/CN2015/084515
§ 371 (c)(1),
(2) Date: Mar. 22, 2017

(87) PCT Pub. No.: WO2016/045438
PCT Pub. Date: Mar. 31, 2016

(65) Prior Publication Data
US 2017/0299903 A1    Oct. 19, 2017

(30) Foreign Application Priority Data

Sep. 25, 2014    (CN) .......................... 2014 1 0495738

(51) Int. Cl.
*G02B 26/00* (2006.01)
*G02F 1/09* (2006.01)
(Continued)

(52) U.S. Cl.
CPC .............. *G02F 1/091* (2013.01); *G02F 1/092* (2013.01); *G02F 1/13* (2013.01); *G02F 1/133* (2013.01);
(Continued)

(58) Field of Classification Search
CPC ............ H01L 21/0337; H01L 21/31144; H01L 21/0338; H01L 21/0276; H01L 21/32139;
(Continued)

(56) References Cited

U.S. PATENT DOCUMENTS

2003/0189557 A1    10/2003    Takagi et al.
2009/0061913 A1    3/2009    Woodruff
(Continued)

FOREIGN PATENT DOCUMENTS

CN    2603586 Y    2/2004
CN    1486445 A    3/2004
(Continued)

OTHER PUBLICATIONS

International Search Report dated Oct. 12, 2015 issued in PCT/CN2015/084515.
(Continued)

*Primary Examiner* — Brandi N Thomas
(74) *Attorney, Agent, or Firm* — Scully Scott Murphy & Presser

(57) ABSTRACT

Disclosed a display screen having a mirror function, a control method, a device and a terminal. The display screen includes: a screen lens (20), a liquid crystal screen (22) and a nano suspension layer (21), wherein the nano suspension layer (21) is disposed between the screen lens and the liquid crystal display. The control method includes: controlling the magnetic layer to provide a static magnetic field perpendicular to the display screen upon receipt of the trigger-off signal; and controlling the upper plate to provide a voltage, or controlling the upper plate to provide a voltage and controlling the magnetic layer to provide a static magnetic field perpendicular to the display screen upon receipt of the trigger-on signal.

6 Claims, 2 Drawing Sheets

(51) Int. Cl.
*G02F 1/13* (2006.01)
*G02F 1/133* (2006.01)
*H04M 1/02* (2006.01)

(52) U.S. Cl.
CPC .......... *H04M 1/02* (2013.01); *G02F 2202/36* (2013.01); *G02F 2203/02* (2013.01)

(58) Field of Classification Search
CPC ....... H01L 2924/0002; H01L 21/02118; H01L 27/10844; H01L 21/02318; H01L 21/0271; H01L 21/3081; H01L 21/3086; H01L 21/31058; H01L 21/76816; H01L 27/10855; H01L 27/246; G02B 1/118; G02B 2207/101; G02B 5/3025; G02B 6/1226; G02B 6/124; G02B 1/04; G02B 1/105; G02B 1/111; G02B 1/14; G02B 5/02
USPC ........ 359/237, 242, 265–267, 290–292, 295, 359/296, 298, 280
See application file for complete search history.

(56) References Cited

U.S. PATENT DOCUMENTS

| | | | |
|---|---|---|---|
| 2012/0224109 A1* | 9/2012 | Okagaki | G02B 5/0242 348/744 |
| 2014/0287237 A1* | 9/2014 | Mahler | B82Y 15/00 428/403 |
| 2015/0037128 A1 | 2/2015 | Küstler | |
| 2015/0276902 A1* | 10/2015 | Weaver | G01R 33/1276 324/309 |

FOREIGN PATENT DOCUMENTS

| | | | |
|---|---|---|---|
| CN | 2000994152 | Y | 12/2007 |
| CN | 102201643 | A | 9/2011 |
| CN | 102707473 | A | 10/2012 |
| CN | 103578400 | A | 2/2014 |
| JP | 2003-140149 | A | 5/2003 |
| JP | 2003-150070 | A | 5/2003 |
| JP | 2007-121997 | A | 5/2007 |
| JP | 2007-286448 | A | 11/2007 |
| JP | 2010-68603 | A | 3/2010 |
| JP | 2013-20879 | A | 1/2013 |
| JP | 2014-54129 | A | 3/2014 |
| WO | WO 2013/179622 | A1 | 12/2013 |
| WO | WO 2016/140359 | A1 | 9/2016 |

OTHER PUBLICATIONS

Japanese Patent Application No. 2003-150070 A, dated May 21, 2003, together with an English-language abstract.
Japanese Patent Application No. 2003-140149 A, dated May 14, 2003, together with an English-language abstract.
Japanese Patent Application No. 2007-286448 A, dated Nov. 1, 2007, together with an English-language abstract.
Japanese Patent Application No. 2013-20879 A, dated Jan. 31, 2013, together with an English-language abstract.
Japanese Patent Application No. 2007-121997 A, dated May 17, 2007, together with an English-language abstract.
Japanese Patent Application No. 2014-54129 A, dated Mar. 20, 2014, together with an English-language abstract.
Japanese Patent Application No. 2010-68603 A, dated Mar. 25, 2010, together with an English-language abstract.
PCT International Publication No. WO 2013/179622 Al, published Dec. 5, 2013, together with an English-language abstract.
PCT International Publication No. WO 2016/140359 A1, published Sep. 9, 2016, together with an English-language abstract.

* cited by examiner

DISPLAY SCREEN HAVING MIRROR FUNCTION, CONTROL METHOD, DEVICE AND TERMINAL

CROSS-REFERENCE TO RELATED APPLICATION

This application is the 371 application of PCT Application No. PCT/CN2015/084515, filed Jul. 20, 2015, which is based upon and claims priority to Chinese Patent Application No. 201410495738.X, filed Sep. 25, 2014, the entire contents of which are incorporated herein by reference.

TECHNICAL FIELD

The present disclosure relates to the field of wireless communication systems, and more particularly, to a display screen having a mirror function, a control method, a device and a terminal.

BACKGROUND

Mobile phones become people's necessities, and people always carry them. For people who want to be more beautiful, mirror is another necessity to be carried. When the display screen becomes black, it is useless, and cannot act as a mirror due to a low reflectivity. In related art, a back surface of a screen lens is coated with a layer of reflective film so as to enhance the reflective effect. However, when the display screen is used for displaying, the reflective film significantly affects the light transmission.

This section provides background information related to the present disclosure which is not necessarily prior art.

SUMMARY

The embodiments of the present disclosure provide a display screen having a mirror function, a control method, a device and a terminal, which can switch the display screen to be a mirror when the display screen is black.

The embodiments of the present disclosure provide a display screen having a mirror function, including a screen lens and a liquid crystal display, and further including: a nano suspension layer, wherein the nano suspension layer is disposed between the screen lens and the liquid crystal display.

Alternatively, the nano suspension layer includes an upper plate, a nanomaterial layer and a grounding plate, the upper plate is disposed between the screen lens and the nanomaterial layer, and the grounding plate is disposed between the liquid crystal display and the nanomaterial layer.

Alternatively, the display screen further includes a magnetic layer provided on a back surface of the liquid crystal display.

Alternatively, a nanomaterial of the nano suspension layer is a lamellar nanomaterial.

Alternatively, a thickness of the lamellar nanomaterial is less than or equal to 100 nm.

Alternatively, the lamellar nanomaterial is a graphene sheet, and a suspension in the nano suspension layer is a sodium dodecyl sulfate solution.

Alternatively, the graphene sheet is silver-plated on both sides.

The embodiments of the present disclosure further provide a control device for a display screen having a mirror function, including: the above display screen, a first trigger, a second trigger and a controller, wherein the first trigger is arranged to send a trigger-on signal to the controller when a first predetermined condition is satisfied;

the second trigger is arranged to send a trigger-off signal to the controller when a second predetermined condition is satisfied; and the controller is arranged to control the magnetic layer to provide a static magnetic field perpendicular to the display screen upon receipt of the trigger-off signal; and to control the upper plate to provide a voltage, or control the upper plate to provide a voltage and control the magnetic layer to provide a static magnetic field perpendicular to the display screen upon receipt of the trigger-on signal.

Alternatively, the first predetermined condition is a light screen signal or an unlock signal or a mirror function disabling signal inputted by a user, and the second predetermined condition is a black screen signal or a lock screen signal or a receipt of a mirror function enabling signal inputted by the user.

The embodiments of the present disclosure further provide a control method for a display screen having a mirror function, applied in the above display screen, wherein the method includes:

controlling the magnetic layer to provide a static magnetic field perpendicular to the display screen upon receipt of the trigger-off signal; and controlling the upper plate to provide a voltage, or controlling the upper plate to provide a voltage and controlling the magnetic layer to provide a static magnetic field perpendicular to the display screen upon receipt of the trigger-on signal.

Alternatively, the voltage provided by the upper plate and the static magnetic field provided by the magnetic layer are determined according to one or more of the following:

the used nanomaterial, an area of the nanomaterial, a thickness of the nanomaterial, and a switching sensitivity.

The embodiments of the present disclosure further provide a terminal including: the above control device.

The embodiments of the present disclosure further provide a computer-readable storage medium storing program instructions to implement the above method when the program instructions are executed.

By utilizing the self-organization technique of the nanomaterial, the embodiments of the present disclosure provide a scheme for switching the display screen to a mirror when the display screen is black without affecting the light transmission through the display screen when the display screen is resumed to display.

This section provides a summary of various implementations or examples of the technology described in the disclosure, and is not a comprehensive disclosure of the full scope or all features of the disclosed technology.

DETAILED DESCRIPTION

Hereinafter, the embodiments of the present disclosure will be described with reference to the accompanying drawings. It is to be noted that without conflict, the embodiments and features in the embodiments of the present application may be combined with each other.

Nano materials and technology become one of the most popular application sciences in the new century. The research focuses on design methods, composition, properties and applications of nano-scale materials and equipment, especially applications from microscopic self-organization to macro-scale. The lamellar nanostructures may be connected into a large and flat surface at macro level under the drive of outside field (light field, magnetic field, and etc.) and organization of micro-forces such as van der Waals force. After the removal of the outside field, the nanomaterials form other organizational structure, and the macro surface will be reversibly disappeared.

Figure 2:
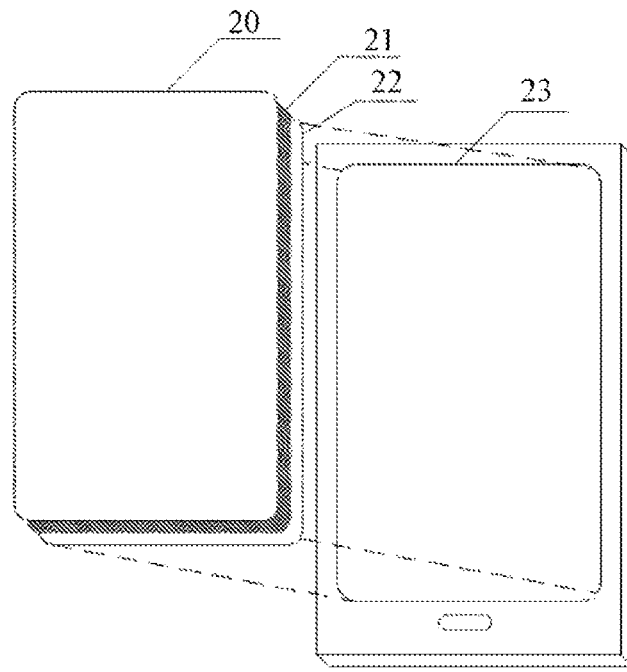
FIG. 2 is a schematic structural view of a terminal display screen according to an embodiment of the present disclosure.

As shown in FIG. 2, the embodiments of the present disclosure provides a display screen having a mirror function, including a screen lens 20, a liquid crystal display 22 and a nano suspension layer 21.

The nano-suspension layer 21 is disposed between the screen lens 20 and the liquid crystal display 22.

The size of the display screen may be optimized according to the effect, which is not limited herein.

Figure 3:
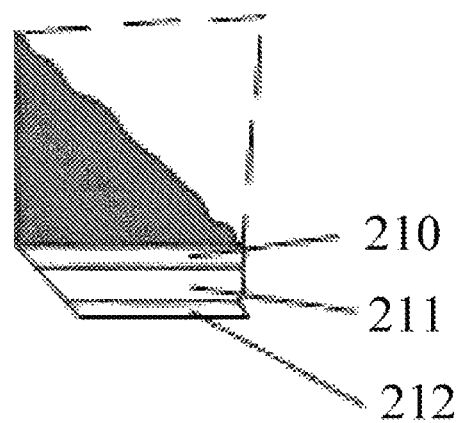
FIG. 3 is a partial enlarged view of a nano suspension layer according to an embodiment of the present disclosure.

Alternatively, as shown in FIG. 3, the nano suspension layer 21 includes an upper plate 210, a nanomaterial layer 211, and a grounding plate 212. The upper plate 210 is disposed between the screen lens 20 and the nanomaterial layer 211. The grounding plate 212 is disposed between the liquid crystal display 22 and the nanomaterial layer 211.

Alternatively, the display screen further includes a magnetic layer 23. The magnetic layer 23 is disposed on a backside of the liquid crystal display 22.

The nanomaterial of the nano suspension layer 21 is a lamellar nanomaterial.

The lamellar nanomaterial may be distributed to be overlapped, or not to be overlapped in a thickness direction.

Alternatively, a thickness of the lamellar nanomaterial is less than or equal to 100 nm.

The lamellar nanomaterial is a graphene sheet, and a suspension in the nano-suspension layer is a sodium dodecyl sulfate solution.

The graphene sheet is silver-plated on both sides.

The embodiments of the present disclosure also provide a control device for a display screen having a mirror function, including: the above-described display screen, a first trigger, a second trigger and a controller.

The first trigger is arranged to send a trigger-on signal to the controller when a first predetermined condition is satisfied.

The second trigger is arranged to send a trigger-off signal to the controller when a second predetermined condition is satisfied.

The controller is arranged to control the magnetic layer 23 to provide a static magnetic field perpendicular to the display screen when receiving the trigger-off signal; and is arranged to, when receiving the trigger-on signal, control the upper plate to provide a voltage, or control the upper plate to provide a voltage and control the magnetic layer 23 to provide a static magnetic field perpendicular to the display screen.

In the display screen of the embodiments of the present disclosure, a layer of lamellar nanomaterial suspension layer 21 is provided between the screen lens 20 and the liquid crystal display 22, and the lamellar nanomaterial has a high reflectivity to light. The distribution of the lamellar nanomaterial is changed by the regulation of the controller and the outside field (magnetic field, electric field, and etc.). When implementing the mirror function, the lamellar nanomaterial is distributed to be parallel to the display screen in a tiled manner by the regulation of the controller and the outside field, so as to constitute a reflective mirror, and then the display screen will naturally become a mirror. When the terminal screen performs the display function, the controller receives the instruction, and regulates the lamellar nanomaterial to be distributed in an array perpendicular to the display screen by the change of the outside field. At this time, a density of the array is relatively small, a duty cycle is relatively low, and then the affect to light transmission is relatively small (below 20%). The display light normally passes through gaps in the array without being blocked by the lamellar nanomaterial.

The first predetermined condition may be a bright screen signal or an unlock signal or a mirror function off signal inputted by a user. The second predetermined condition may be a black screen signal or a lock screen signal or a mirror function enabling signal inputted by the user.

Figure 1:
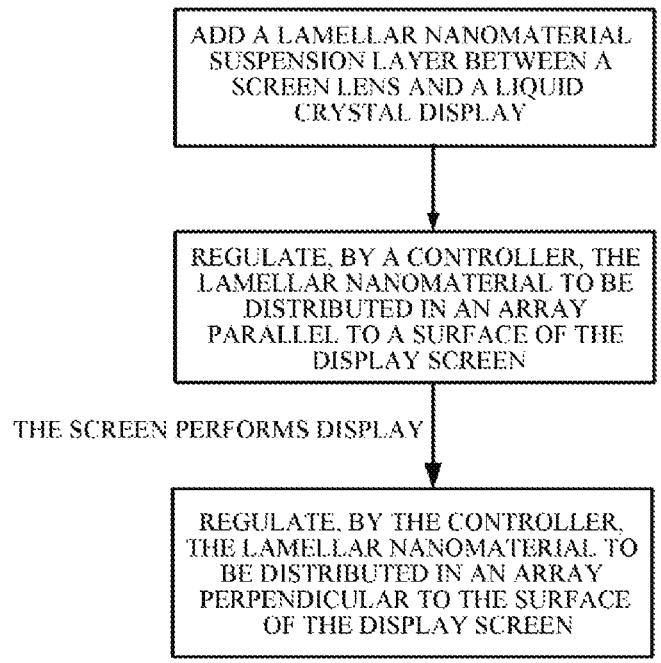
FIG. 1 is a block diagram of a procedure according to an embodiment of the present disclosure.

As shown in FIG. 1, a control method for a display screen having a mirror function according to an embodiment of the present disclosure includes:

when a trigger-off signal is received, controlling the magnetic layer 23 to provide a static magnetic field perpendicular to the display screen; and when a trigger-on signal is received, controlling the upper plate 210 to provide a voltage, or controlling the upper plate 210 provides a voltage and controlling the magnetic layer 23 to provide a static magnetic field perpendicular to the display screen.

The voltage provided by the upper plate 210 and the static magnetic field provided by the magnetic layer 23 are determined according to one or more of the following:

the used nanomaterial, an area of the nanomaterial, a thickness of the nanomaterial, and a switching sensitivity.

The voltage provided by the upper plate 210 is generally 1-12V. Herein, 3V, 5V, 9V, 12V which have be used by internal chips or units of the mobile phone may be used, and it is possible to not separately transform voltage for the upper plate 210 used in the embodiments of the present disclosure. The switching sensitivity of the terminal screen between the display function and the mirror function is also a factor for determining a magnitude of the voltage provided by the upper plate and a magnitude of the static magnetic field provided by the magnetic layer 23.

First Application Example

As shown in FIGS. 1 and 2, a lamellar nanomaterial suspension layer 21 is sandwiched between the screen lens 20 and the liquid crystal display 22. FIG. 3 illustrates a partial enlarged view of the lamellar nanomaterial suspension layer 21. The lamellar nanomaterial suspension layer 21 includes a transparent upper plate 210, a nanomaterial suspension (i.e., the above nanomaterial layer) 211, and a transparent grounding plate 212. The nanomaterial suspension 211 is sandwiched by the transparent upper plate 210 and the transparent grounding plate 212 (the transparent plate is an indium tin oxide transparent conductive film). When the terminal screen displays the transmitted light, a certain voltage (e.g., 3V) is applied on the upper plate 210, and an electric field perpendicular to the surface of the display screen is formed in the nanomaterial suspension 211, which electric field may drive the lamellar nanomaterial to be perpendicular between the two plates. The nanomaterial suspension 211 includes a nanomaterial and a suspension. Herein, a graphene sheet (size: 1 um-10 um) coated with a silver of 10 nm thickness (the thickness of the plated silver is only illustrative herein, and it may have any thickness as long as it can reflect) on both sides is used as the lamellar nanomaterial, and water dissolved with SDS (sodium dodecyl sulfate, one of a dispersion) is used as a solvent. Herein, SDS is to avoid the accumulation of the graphene sheet. When implementing the mirror function, the bottom magnetic layer 23 provides a static magnetic field perpendicular to the surface. Under the action of the static magnetic field, the graphene sheet is arranged perpendicularly to the magnetic field due to its antirust property, and is distributed horizontally parallel to the surface of the display surface to form a reflecting surface.

Second Application Example

As shown in FIGS. 1 and 2, in the present embodiment, the bottom magnetic layer 23 is always present, and a default state of the lamellar nanomaterial suspension layer 21 is a mirror. In this way, when the screen of the mobile phone is black, or even the power is turned off, the screen is a silver reflecting mirror; and when the display screen is awakened, the upper plate 210 of the lamellar nanomaterial suspension layer 21 is pressurized and the screen is normally light-transmissive.

At this time, the switch of the outside field can be reduced. As the impact of the electric field may be much greater than the impact of the magnetic field, and the torsional torque ratio of the electric field may exceed $10^4$, when the terminal screen displays the transmitted light, the effect of the magnetic field is almost completely offset, and the lamellar nanomaterial can form an array distribution with a very good erectness. In this embodiment, the thickness of the lamellar nanomaterial is about 20 nm, which is very small relative to its surface size of 1 um-10 um, so the density of the vertical array is relatively small and the duty ratio is extremely low (0.5% or less). For the light emitted from the display screen, the transmission is almost not affected.

It will be understood by those skilled in the art that all or a part of the steps in the above-described method may be accomplished by a program that instructing the associated hardware. The above program may be stored in a computer-readable storage medium, such as a read-only memory, a magnetic disk, or an optical disk. Alternatively, all or a part of the steps in the above embodiments may also be implemented by using one or more integrated circuits. Accordingly, individual modules/units in the above embodiments may be implemented in the form of hardware, or may be implemented in the form of software function modules. The embodiments of the present disclosure are not limited to any particular form of combinations of hardware and software.

INDUSTRIAL APPLICABILITY

The embodiments of the present disclosure provide a scheme for switching the display screen to a mirror when the display screen is black without affecting the light transmission through the display screen when the display screen is resumed to display.

What is claimed is:

1. A control device for a display screen having a mirror function, comprising: a display screen having a mirror function, a first trigger, a second trigger and a controller, wherein
    the display screen comprises a screen lens, a liquid crystal display, a nano suspension layer, and a magnetic layer provided on a back surface of the liquid crystal display;
    the nano suspension layer is disposed between the screen lens and the liquid crystal display;
    the nano suspension layer comprises an upper plate, a nanomaterial layer and a grounding plate;
    the upper plate is disposed between the screen lens and the nanomaterial layer and the grounding plate is disposed between the liquid crystal display and the nanomaterial layer;
    the first trigger is arranged to send a trigger-on signal to the controller when a first predetermined condition is satisfied;
    the second trigger is arranged to send a trigger-off signal to the controller when a second predetermined condition is satisfied; and
    the controller is arranged to control the magnetic layer to provide a static magnetic field perpendicular to the display screen upon receipt of the trigger-off signal; and to control the upper plate to provide a voltage, or control the upper plate to provide a voltage and control the magnetic layer to provide a static magnetic field perpendicular to the display screen upon receipt of the trigger-on signal.

2. The device of claim 1, wherein the predetermined condition is a light screen signal or an unlock signal or a mirror function disabling signal inputter by a user, and the second predetermined condition is a black screen signal or a lock screen signal or a receipt of a mirror function enabling signal inputted by the user.

3. A control method for a display screen having a mirror function, applied in a display screen, wherein
    the display screen comprises a screen lens, a liquid crystal display, a nano suspension layer, and a magnetic layer provided on a back surface of the liquid crystal display,
    the nano suspension layer is disposed between the screen lens and the liquid crystal display,
    the nano suspension layer comprises an upper plate, a nanomaterial layer and a grounding plate,
    the upper plate is disposed between the screen lens and the nanomaterial layer and the grounding plate is disposed between the liquid crystal display and the nanomaterial layer;
    wherein the method comprises:
    controlling the magnetic layer to provide a static magnetic field perpendicular to the display screen upon receipt of the trigger-off signal; and
    controlling the upper plate to provide a voltage, or controlling the upper plate to provide a voltage and controlling the magnetic layer to provide a static magnetic field perpendicular to the display screen upon receipt of the trigger-on signal.

4. The method of claim 3, wherein the voltage provided by the upper plate and the static magnetic field provided by the magnetic layer are determined according to one or more of the following:
    the used nanomaterial, an area of the nanomaterial, a thickness of the nanomaterial, and a switching sensitivity.

5. A terminal comprising: the control device of claim 1.

6. A computer-readable storage medium storing program instructions to implement the method of claim 3 when the program instructions are executed.

* * * * *